United States Patent
Al Hassanat et al.

(10) Patent No.: US 10,318,602 B2
(45) Date of Patent: Jun. 11, 2019

(54) GEO-REFERENCED VIRTUAL ANCHOR MANAGEMENT SYSTEM FOR MEDIA CONTENT ACCESS FROM PHYSICAL LOCATION

(71) Applicants: Fahed Al Hassanat, Gatineau (CA); Robert Laganiere, Gatineau (CA)

(72) Inventors: Fahed Al Hassanat, Gatineau (CA); Robert Laganiere, Gatineau (CA)

( * ) Notice: Subject to any disclaimer, the term of this patent is extended or adjusted under 35 U.S.C. 154(b) by 240 days.

(21) Appl. No.: 15/122,837

(22) PCT Filed: Mar. 19, 2015

(86) PCT No.: PCT/CA2015/050203
§ 371 (c)(1),
(2) Date: Aug. 31, 2016

(87) PCT Pub. No.: WO2015/139133
PCT Pub. Date: Sep. 24, 2015

(65) Prior Publication Data
US 2017/0060888 A1 Mar. 2, 2017

Related U.S. Application Data

(60) Provisional application No. 61/955,563, filed on Mar. 19, 2014.

(51) Int. Cl.
*H04W 4/02* (2018.01)
*G06F 16/29* (2019.01)
*G06F 16/9537* (2019.01)

(52) U.S. Cl.
CPC .......... *G06F 16/9537* (2019.01); *G06F 16/29* (2019.01); *H04W 4/02* (2013.01); *H04W 4/023* (2013.01); *H04W 4/025* (2013.01)

(58) Field of Classification Search
CPC .......... G06F 17/3087; G06F 17/30241; G06F 17/30061; G06F 17/30; G06F 2221/2111;
(Continued)

(56) References Cited

U.S. PATENT DOCUMENTS

7,289,812 B1 * 10/2007 Roberts ............... G08G 1/0962
342/350
7,787,890 B2 8/2010 Choi
(Continued)

OTHER PUBLICATIONS

International Search Report and Written Opinion for PCT/CA2015/050203 dated Jul. 16, 2015.

*Primary Examiner* — Evan Aspinwall
(74) *Attorney, Agent, or Firm* — Brion Raffoul

(57) ABSTRACT

Methods, systems, and devices for sharing a physical location with online users by requiring the online users to be in physical proximity of a specific physical location before the users can experience media content associated with the physical location. A user can mark a physical location when that user is at the location by associating a virtual anchor with that location. The virtual anchor creates a data structure that contains the location's geographic coordinates as well as other details regarding the anchor. The user can also associate media content with the virtual anchor. The virtual anchor can be shared with other users and these other users are notified of the presence of the virtual anchor when they are within a physical proximity from the physical location. Only when the other users are at the location can these users access the media content associated with the virtual anchor.

5 Claims, 4 Drawing Sheets

(58) Field of Classification Search
CPC ...... G06F 16/9537; G06F 16/29; H04W 4/02;
H04W 4/023; H04W 4/025; H04W 40/20;
H04W 4/021; H04W 4/029; H04L 51/20
USPC .......................................................... 707/737
See application file for complete search history.

(56) References Cited

U.S. PATENT DOCUMENTS

| | | | |
|---|---|---|---|
| 2007/0258642 A1* | 11/2007 | Thota | G06F 17/30241 |
| | | | 382/173 |
| 2011/0190009 A1 | 8/2011 | Gerber, Jr. et al. | |
| 2012/0209657 A1* | 8/2012 | Connolly | G06Q 20/3224 |
| | | | 705/7.29 |
| 2015/0095355 A1* | 4/2015 | Patton | G06F 17/30241 |
| | | | 707/754 |
| 2015/0116360 A1* | 4/2015 | Jones | G06T 11/60 |
| | | | 345/634 |

* cited by examiner

GEO-REFERENCED VIRTUAL ANCHOR MANAGEMENT SYSTEM FOR MEDIA CONTENT ACCESS FROM PHYSICAL LOCATION

TECHNICAL FIELD

The present invention relates to Internet related software. More specifically, the present invention relates to software which allows a user to place a virtual marker or anchor to mark a physical location, associate media with the anchor, and share that anchor with others who physically visit the location.

BACKGROUND OF THE INVENTION

The growth and seeming ubiquity of the Internet in the past few years has led to an explosion of applications and software that takes advantage of the constant network connection that mobile devices offer users. Nowadays, users of mobile devices can share photos, thoughts, ideas, and even food choices with friends and the public in general. However, what they cannot share, as yet, are location specific experiences.

Current mobile devices are equipped to take digital photographs, audio recordings, text input, and other types of media input. These photographs, recordings, text, and other media can be shared with friends and the world in general by way of full-blown blogs, micro-blogging websites and applications, picture sharing websites and applications, and, of course, other avenues in social media. A mobile device user can snap a digital photograph of a tree and share that photo with his or her friends through photo sharing applications or the photograph can be shared by being posted on a social media website such as Facebook™. Similarly, a user can share his or her experience regarding a restaurant or store by marking and reviewing that restaurant on websites that offer reviews on such establishments. A user can also share his or her thoughts on a place or location by sending a short text-based message regarding that place or location to a micro-blogging site such as Twitter™. However, none of these options take into account that the relevance of information might significantly increase when the users are at the associated physical location. To continue with the example above of a tree, a user can only share that tree's location with others by perhaps posting the tree's physical location online. The physical experience of being at that specific location with the tree cannot, as yet, be shared online.

From the above, there is therefore a need for methods, systems, and devices which mitigate if not overcome the drawbacks and shortcomings of the prior art. A means of easily sharing a physical location with others using an online medium while also sharing media content would be desirable.

SUMMARY OF INVENTION

The present invention relates to methods, systems, and devices for sharing content associated with a physical location with online users by requiring the online users to be in physical proximity of a specific physical location before the users can experience media content associated with that specific physical location. A user can mark a physical location when that user is at the location by placing a virtual anchor at that location. The virtual anchor creates a data structure that contains the location's geographic coordinates as well as other details regarding the anchor. The user can also upload/associate media content with the virtual anchor. The virtual anchor can be shared with other users. These other users are notified of the presence of the virtual anchor when they are within a predetermined physical distance from the physical location. Only when the other users are at the physical location can the media content associated with the virtual anchor be accessed by the other users.

In a first aspect, the present invention provides a method for creating a virtual anchor for a specific geographic location, the method comprising:
  a) receiving an input from a user to create said virtual anchor for said geographic location, said user being physically at said geographic location;
  b) receiving geographic coordinates for said geographic location;
  c) creating a virtual anchor data structure for said geographic location, said data structure containing details regarding said virtual anchor for said geographic location including said geographic coordinates for said geographic location;
  d) uploading said virtual anchor data structure for said geographic location to an anchor database, said anchor database being configured for storing virtual anchor data structures for multiple users.

In a second aspect, the present invention provides a method for accessing media content relating to a specific virtual anchor for a specific geographic location by way of a mobile computing device, the method comprising:
  a) receiving geographic coordinates of a mobile device location for said mobile computing device;
  b) determining that said mobile device location matches a location of said specific geographic anchor location;
  c) alerting a user of said mobile computing device of a presence of said specific virtual anchor;
  d) providing said user with at least one option for dealing with said specific virtual anchor, said at least one option being at least one of:
    ignoring said specific virtual anchor;
    accessing at least one media content associated with said specific virtual anchor;
    adding media content to be associated with said specific virtual anchor;
  e) receiving input from said user relating to said at least one option provided in step d); and
  f) executing instructions based on said input received in step e) for said at least one option provided in step d).

In a third aspect, the present invention provides a method for accessing media content relating to specific virtual anchors for specific geographic locations by way of a mobile computing device, the method comprising:
  a) receiving input relating to a planned route for a mobile device used by a user;
  b) determining geographic coordinates for said planned route;
  c) sending a query to a server for virtual anchors associated with geographic locations within a predetermined distance of said planned route, said query containing said geographic coordinates for said planned route;
  d) receiving details for said virtual anchors associated with geographic locations within said predetermined distance of said planned route, said details including geographic coordinates of said geographic locations;
  e) downloading at least one media content for each of said virtual anchors in step d) to said mobile device;
  f) determining geographic coordinates of a mobile device location for said mobile computing device;

g) determining if geographic coordinates of said mobile device location is within a first predetermined distance of geographic coordinates of at least one of said geographic locations;

h) in the event said geographic coordinates of said mobile device location is within a first predetermined distance of geographic coordinates of at least one of said geographic locations, alerting said user of a presence of at least one nearby virtual anchor, each of said at least one nearby virtual anchor being associated with said geographic location whose geographic coordinates are within said first predetermined distance of said geographic coordinates of said mobile device location;

i) determining if said mobile device is within a range of a specific geographic location, said mobile device being within said range of said specific geographic location when geographic coordinates of said mobile device location is within a second predetermined distance from geographic coordinates of said specific geographic location, said specific geographic location being associated with said at least one virtual anchor and said second predetermined distance being less than said first predetermined distance;

j) in the event said mobile device is within range of said specific geographic location, alerting a user of said mobile computing device of a presence of one of said at least one nearby virtual anchor; and k) repeating steps f)-j) while said mobile device travels on said planned route.

In a fourth aspect, the present invention provides a system for providing virtual anchors for specific geographic locations to users, the system comprising:

a virtual anchor database for storing a plurality of virtual anchors;

a media content database for storing media content associated with said virtual anchors;

a user database for storing user identification data for a plurality of users;

wherein each virtual anchor is associated with at least one user and at least one media content;

said virtual anchor database, media content database, and user database are accessible by way of mobile computing devices operated by said users.

In a fifth aspect, the present invention provides a method for providing media content to users, the method comprising:

a) associating a physical location with a virtual anchor;

b) alerting a user to a presence of a virtual anchor by way of said user's mobile computing device when said mobile computing device is physically near said physical location;

c) downloading media content to said mobile computing device, said media content being associated with said virtual anchor;

d) presenting said media content to said user by way of said mobile computing device.

In a sixth aspect, the present invention provides a method for accessing media content relating to specific virtual anchors for specific geographic locations by way of a mobile computing device, the method comprising:

a) receiving input relating to a planned route for a mobile device used by a user;

b) determining geographic coordinates for said planned route;

c) sending a query to a server for virtual anchors associated with geographic locations within a predetermined distance of said planned route, said query containing said geographic coordinates for said planned route;

d) receiving details for said virtual anchors associated with geographic locations within said predetermined distance of said planned route, said details including geographic coordinates of said geographic locations;

e) downloading at least one media content for each of said virtual anchors in step d) to said mobile device;

f) determining geographic coordinates of a mobile device location for said mobile computing device;

g) determining if geographic coordinates of said mobile device location is within a range of geographic coordinates of a specific geographic location associated with a specific virtual anchor found in step d);

h) in the event said mobile device is within range of said specific geographic location, alerting a user of said mobile computing device of a presence of one of said at least one nearby virtual anchor; and i) repeating steps f)-h) while said mobile device travels on said planned route.

BRIEF DESCRIPTION OF THE DRAWINGS

The embodiments of the present invention will now be described by reference to the following figures, in which identical reference numerals in different figures indicate identical elements and in which.

DETAILED DESCRIPTION

The present invention therefore provides a novel method of accessing Internet-based content. Instead of accessing media content by entering or activating the network address (e.g. a URL) of a piece of media content to access that media content, the user has to be in the region/physical proximity/ near a specific physical location dictated by the creator of the association. A user thus visits a physical location and creates a virtual anchor associated with that physical location and associates that virtual anchor with media content. Another user, to access the media content, will need to be at the same physical location (or at least nearby) before the media content can be unlocked for access or accessed. As will be explained below, the system can also be used in offline mode for ease of access.

Figure 1:
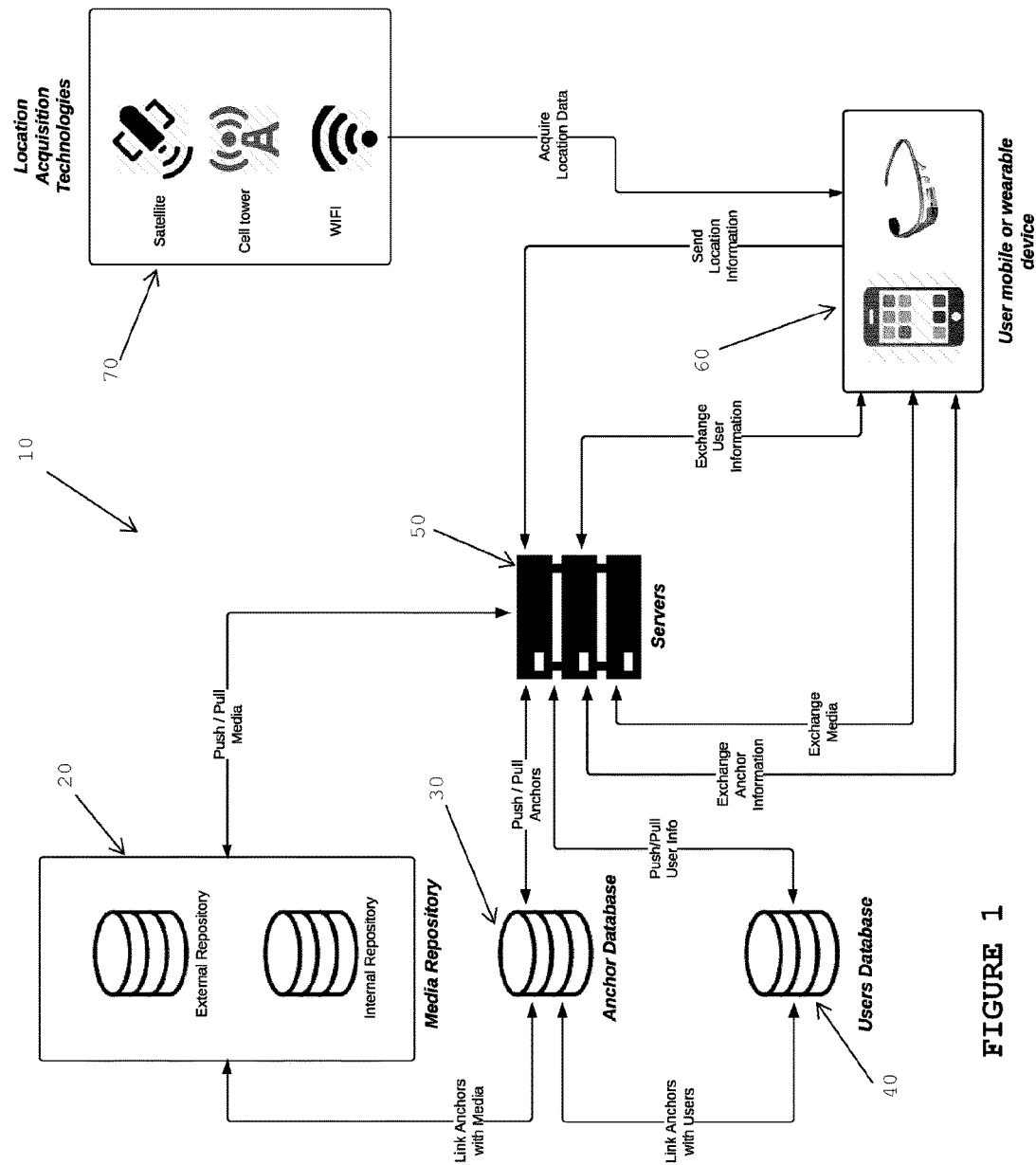
FIG. 1 is a block diagram of a system for providing virtual anchors according to one aspect of the invention.

Referring to FIG. 1, a block diagram of a system according to one aspect of the invention is illustrated. The system 10 may be used with other aspects of the invention.

The system 10 includes a media content database 20, a virtual anchor database 30, and a user database 40. The various databases are coupled to servers 50 through which the contents of the databases are accessible. The servers 50 are accessible to mobile computing devices 60 by way of various internal and external networks including the Internet. Each of the various mobile computing devices 60 is, generally, able to retrieve geographic coordinates of its location by way of one or more location technologies including satellites 70 (e.g. using the Global Positioning System (GPS) or the GLONASS (Global Navigation Satellite System) system) or any combination of GPS, cell tower-based location processes, wireless Internet signal processing, Bluetooth sensors, IP addresses, network environment data, or any other location technologies.

In operation, the mobile computing devices receive their mobile device location (i.e. their geographic coordinates) using the satellite(s) or any other location technology. The mobile computing device then compares these geographic coordinates with the geographic coordinates of virtual anchors in the anchor database. If there is a virtual anchor nearby, the mobile device checks to determine if the user is allowed to access the virtual anchor. This is done by checking the anchor database and the user database. In the event the user is allowed to access the virtual anchor and the anchor's content conforms to the user's set preferences or conforms to the user's profile (i.e. is from the user's group or belongs to one of the user's categories), the user is alerted of the presence of the virtual anchor and the user is queried whether the user wishes to access media content associated with that virtual anchor. If the user wishes to access the media content, the mobile device retrieves the related media content from the media content database and presents this content to the user.

It should be noted that a virtual anchor is a marker that associates a specific geographic location with specific user specified media content. The details regarding the virtual anchor are stored in a virtual anchor data structure that contains the relevant information for that virtual anchor. These details include the geographic coordinates of the virtual anchor, the user who created the virtual anchor, permissions for the virtual anchor (i.e. is the virtual anchor editable and by whom), accessibility for the virtual anchor (i.e. who can access the virtual anchor), and an identification of the media content associated with the virtual anchor. Other details may, of course, form part of the virtual anchor data structure. The various instances of the virtual anchor data structure, containing details for the different virtual anchors, are stored in the virtual anchor database. The media content relating to the various virtual anchors are stored in the media content database and are accessible to users who are able to access the virtual anchor.

It should further be noted that, in one embodiment, a user allowed to access a specific virtual anchor can only access the media content associated with that specific virtual anchor when the mobile computing device used by that user has a location that matches the specific geographic location associated with that specific virtual anchor. This means that the user (or his mobile computing device) will need to be in the proximity of or near the location associated with the virtual anchor before the media content associated with the virtual anchor can be accessed. As will be explained below, when a user's location "matches" an anchor's location, this is to mean that the user is within a specific distance, proximity, or range from a specific anchor's location.

The geographic coordinates of the location associated with a virtual anchor may be determined by numerous means. In one implementation, the geographic coordinates are gathered by accessing GPS or similar technologies and services to receive a specific location's longitude and latitude. Alternatively, if the specific location for a virtual anchor is in an environment with street addresses, the specific location's street address may be used in lieu of or in addition to the location's longitude and latitude for the location's geographic coordinates. The street address may be automatically gathered using online mapping services such as, for example, Google Maps™. A specific location's geographic coordinates may also be determined by using hybrid positioning systems that use any combination of GPS, cell tower-based location processes (e.g. cell tower signal triangulation), wireless Internet signal processing, Bluetooth sensors, IP addresses, network environment data, and other location technologies.

To determine if a user's mobile computing device's location matches the specific location associated with a virtual anchor, the same methods and processes used to determine the geographic coordinates for the virtual anchor may also be used to locate the mobile computing device.

As can be imagined, the user's mobile computing device is, preferably, capable of accessing the Internet as well as GPS, other similar satellite location technologies or other known location technologies. While a persistent Internet connection is preferable for the mobile computing device, periods when the device is offline can be compensated for as will be explained below.

To create a virtual anchor, a user first brings his or her mobile computing device to a specific geographic location the user wants to associate with the virtual anchor. The user then operates software that creates an instance of the virtual anchor data structure and the software can automatically populate the relevant fields of the data structure as needed. As an example, the software can query the mobile device's GPS subsystem and retrieves the geographic coordinates of the specific location. These geographic coordinates are then entered into the virtual anchor data structure along with the user's identification. The user then selects or creates media content to be associated with the virtual anchor. The user can then set the parameters for the virtual anchor which may include an identification of who may access the virtual anchor, whether the virtual anchor may be edited by someone other than the user who created the virtual anchor, and who may access the media content associated with the virtual anchor. Once the necessary fields in the data structure have been completed, the virtual anchor data structure as well as the media content to be associated with the virtual anchor can both be uploaded to the media content database and to the virtual anchor database. The virtual anchor data structure is then stored in the virtual anchor database while the media content is stored in the media content database. Of course, the virtual anchor is associated with the relevant media content so that the media content can be retrieved if and when necessary by merely accessing the virtual anchor.

Once the virtual anchor has been created, users who are allowed or authorized to access the virtual anchor can be alerted to its presence and can access the media content associated with it. The media content can only by accessed by an authorized user when that user's mobile computing device's location matches the same location as the original specific location used by the user who created the virtual anchor when that virtual anchor was created. It should be noted that, given the inherent inaccuracies of satellite and mobile device based location technologies, an exact match between the authorized user's location and the creator user's original specific location is not necessary. The authorized user merely has to be within a predetermined range or distance from the original specific location to trigger the virtual anchor. Once the authorized user is within range of the original specific location associated with the virtual anchor (i.e. the authorized user's location matches the original specific location), the user is alerted to the presence or existence of the virtual anchor. The user is then prompted regarding that virtual anchor. Depending on the authorized user's authorizations and the settings on the virtual anchor, the user may be prompted to view the media content, add media content to be associated with the virtual anchor, edit the virtual anchor, or ignore the virtual anchor. If the user's response to the prompt indicates that the user merely wishes to view the media content, the media content is retrieved from the media content database and then presented to the user. If the user's response indicates that the user wants to add additional media content to be associated with the virtual anchor, the user selects or creates the media content to be added. This new media content to be associated with the virtual anchor is then uploaded to the media content database and, once uploaded, is associated with that particular virtual anchor. Should the user's response indicate a desire to edit the virtual anchor, the virtual anchor data structure is retrieved and presented to the user. The user then edits the virtual anchor and, once done, the virtual anchor data structure is again uploaded to the virtual anchor database for storage. If the user's response indicates that he wishes to ignore or not interact with the virtual anchor present, the prompts for that virtual anchor are dismissed and the user is no longer prompted for that virtual anchor for that particular match in location between the user's mobile computing device and the original specific location for the virtual anchor. Of course, the content of the ignored virtual anchor remains active and the virtual anchor remains detectable. If the virtual anchor data structure or its media content has been edited or added to by a user other than the creator of the virtual anchor, one configuration is that the creator is notified of this change.

It should be noted that, to determine whether a user's mobile computing device is within range (i.e. within a predetermined distance or that the device's location matches the location of an anchor) from a location associated with a given virtual anchor, the mobile device's location is first determined by way of the geographic coordinates of that mobile device. First, the mobile device's geographic coordinates are found. As noted above, this can be done by querying a satellite based geo-location system such as GPS or GLONASS. Alternatively, other non-satellite based location systems, such as those based on cell phone tower triangulation, can also be used. Once the mobile device's geographic coordinates are known, these coordinates are compared/matched with the geographic coordinates of the specific location associated with the virtual anchor. If the geographic coordinates of the specific location are within a predetermined distance from the geographic location of the mobile computing device, then a match between the mobile device location and the location for the virtual anchor can be said to have been found. The predetermined distance between the mobile computing device location and the virtual anchor location can, of course, be a system parameter set by the system operators.

In another embodiment, a user can be alerted to a virtual anchor's presence based on the virtual anchor's "sensitivity", a parameter set for each virtual anchor by way of the virtual anchor's settings file. If a virtual anchor's sensitivity is set to, as an example, 100 meters, then if the user's mobile computing device is within 100 meters of the virtual anchor location, then the user is alerted to the virtual anchor's presence. As well, once a user is alerted to the virtual anchor's presence, the user is also given an indication as to the direction of the virtual anchor relative to the user mobile device's current location.

If the user is intending to travel to a region that might not have wireless coverage or where an Internet connection is not available for his mobile computing device, the user may configure the mobile computing device to operate in an offline mode. In such an offline mode, if the user's itinerary (and hence the itinerary of the mobile computing device) is known, any virtual anchors in the region may still have their media content accessible to the user. For this, the user first enters a projected itinerary, including a starting point, a route, and a destination or end point. The mobile computing device then determines the geographic coordinates of the route as well as the starting and end points. A search is then determined on the virtual anchor database to find virtual anchors whose specific locations are within a specific predetermined distance from the user's projected route. The data relating to these virtual anchors whose locations are within the predetermined distance from the route is then downloaded to the mobile computing device. This data can encompass the virtual anchor data structure, the data in that data structure (including the geographic coordinates of the specific location for the virtual anchor), as well as at least some, if not all, the media content associated with that virtual anchor. This data is then stored on the user's mobile computing device for later use. As the user traverses his route, the mobile device's geographic coordinates are compared with the stored geographic coordinates of potentially nearby virtual anchors stored on the mobile computing device. When the user's geographic coordinates are within a given predetermined distance from a specific location for one of the stored virtual anchors, the user is alerted of this presence of a virtual anchor. The user is then prompted regarding this virtual anchor. The prompt may include an indication of how far the user is from the location as well as the direction of the location from the user. To access the media content for the nearby location for a virtual anchor, the user must be within range of the specific location as noted above. Once the user is within range or within a proximity of the location, the preloaded content for that virtual anchor is unlocked and the user is alerted to the availability of the media content associated with the virtual anchor associated with the user's current location. The user can, depending on the virtual anchor settings downloaded, then view the media content, add to the media content (for later uploading to the servers), edit the virtual anchor, or ignore the virtual anchor media content. If the user wishes to view the media content, this media content downloaded prior to the mobile device going offline is then presented to the user.

For offline editing of virtual anchors or for offline creation of virtual anchors, the steps taken are almost the same as for when the user is online, the only difference being that the created or edited material is stored on the mobile computing device while offline. This material is then uploaded to the various servers once the mobile computing device is again online.

It should be noted that the predetermined distance to be within range or within the proximity of a virtual anchor location and the predetermined distance to be near a nearby virtual anchor are different. The predetermined distance to be within range of a virtual anchor so that the media content for that virtual anchor is accessible is in the order of anywhere from 5 to 15 feet, depending on the configuration of the system implementing one aspect of the invention. However, to be near a virtual anchor so that a user may be alerted to a nearby anchor, the predetermined distance may be in the order of 20 to 30 feet, if not more. The range is therefore the distance a user has to be from a specific location to match that location so that the user may access the media content. This predetermined distance is smaller or lesser than the distance a user has to be from a specific location when the user is alerted to the presence of a nearby virtual anchor. It should be noted that the distances and ranges given above are merely by way of example and should not be taken as requirements for the invention.

As noted above, in one implementation, a sensitivity setting can be provided for as part of each virtual anchor's parameters. The sensitivity setting can be used to determine how far a mobile device's location can be from a virtual anchor location before the user is alerted to the virtual anchor's presence and before the mobile device can access the virtual anchor's content. From the example given above where the sensitivity was set to 100 meters, this means that, once the user mobile device's location is 100 meters from the virtual anchor's specific location, the user is alerted to the virtual anchor's presence and the virtual anchor's content becomes accessible to the user. Not only that, but the user may also be directed to the virtual anchor's specific location based on the user mobile device's current location. It should be noted that the sensitivity parameter may be user/creator configured. A public virtual anchor creator may, therefore, set a high sensitivity so that more users can detect the virtual anchor and attract more views.

Regarding the virtual anchor data structure, the data structure may have fields which are user editable and other fields which are set by default according to the implementation of the system. Once populated, the editable fields may be edited by the user who created the virtual anchor. Other fields may, depending on the settings, also be editable by those users given the authority to do so. These fields, some of which may determine the system behavior associated with the virtual anchor, may include:

a virtual anchor identification/identifier,
a title for the virtual anchor,
a rating and/or ranking of the anchor—this may be used to determine which virtual anchor is presented first to a user if there are competing virtual anchors in the area
specific location associated with the virtual anchor in latitude, longitude, and altitude, or physical address
virtual anchor owner/creator,
virtual anchor date of creation,
a lifetime (or expiry) for the virtual anchor (the duration after which the virtual anchor will be removed)
predetermined distance from the specific location before the user is alerted to the virtual anchor presence (i.e. a sensitivity setting)
optionally, an address field may also be used with the closest physical address to the virtual anchor specific location being entered in this optional field,
list of users or groups that can view or be alerted to the virtual anchor
optionally, list of users or groups that can view or access the media content associated with the virtual anchor. Note that this list may be different from the list above as the users who can be alerted to the presence of the virtual anchor may not be the same list as those allowed to access all the media content associated with the virtual anchor. This list may only be present if the implementation uses differing levels of access to specific virtual anchors
an advertisement field which indicates whether advertisements are allowed or not for the virtual anchor. As part of this field, subfields indicating advertising providers and the network/Internet locations of the advertising may also be present,
a statistics field with subfields for preferred location acquisition technologies, an average location error, average signal strengths for satellite signals, WiFi signals, and cell towers signals, how many times the anchor has been accessed, how many times the anchor has been ignored, the average time of day the anchor has been accessed, the average length of time the anchor has been accessed, and the number of times advertisements have been accessed through the virtual anchor,
a virtual anchor status field with the following sub-fields:
    private—only those specifically listed can access the virtual anchor and its media content
    public—all users can access the virtual anchor
    active/dormant—virtual anchor status as set by creator. If a virtual anchor is active, it can be interacted with. If dormant, it cannot be interacted with
    open—users other than the virtual anchor creator can edit/add to the virtual anchor or its media content. The type of media content which can be associated with a specific virtual anchor can be set by the virtual anchor creator
    closed—only the virtual anchor creator can edit/add to the virtual anchor or its media content
virtual anchor category—one or more categories under which the virtual anchor is classified. This can be used to filter virtual anchors for users with specific interests and/or requirements,
media content list—a listing of the media content associated with the specific virtual anchor. This may be used to retrieve the media content from the media content database or it can be used by a user to select which media content he or she wishes to view for this specific virtual anchor. The list can also contain fields specific to each piece of media content including fields for the owner of the media content, the type of media content, the date the content was added, a rating of the media content by viewers, and a network/Internet location where the media content can be retrieved from,
media type list—a listing of the types of media which can be added by users to the virtual anchor.

From the above, it can be seen that virtual anchors are associated with at least one category. Categories may be used by users to find virtual anchors which conform to his/her requirements. As an example, if the user was interested in historical sites, the user may perform a search for virtual anchors that fall under categories that include history, historical sites, historical events, or the like. Thus, any virtual anchors in the user's vicinity or area that fall under those categories will be presented to the user. Of course, virtual anchors which fall under those categories but to which the user does not have access (e.g. private virtual anchors) are not presented to the user. Categories can also be used to inform users of new developments in their field of interest. If a development from one of the authors or groups to which they belong occurs (e.g. new anchors are created or new content associated with anchors have been updated), then the user can be notified of such a development.

It should also be noted that, in one implementation, each user has a status with respect to specific virtual anchors. If a user has not yet accessed the media content associated with a specific virtual anchor which the user is allowed or authorized to access, then that media content is still available to that user. When a user is in range of that specific virtual anchor and accesses all the media content associated with that specific virtual anchor, the virtual anchor and its media content are then tagged as being already viewed or accessed as that user has already accessed the media content. When the same user is again in the same location, that user is alerted in a different manner to the availability or presence of the virtual anchor at that location as the virtual anchor has nothing new to offer to that user. This different manner of alerting notifies the user that the nearby anchor is one that has already accessed. If new media content or some other event changes the status of the virtual anchor (e.g. new media content has been added by the virtual anchor creator or by some other user), the user who has previously accessed the media content will now be alerted to the new media content but only when that same user is at the location for the virtual anchor. Of course, the system may be configured so that that same user can be alerted to new content for that same virtual anchor. However, the new content cannot be accessed until the user visits the specific location for the virtual anchor. If a user chooses to ignore alerts regarding a virtual anchor, the user's status relative to that virtual anchor is not changed.

In another implementation of the invention, the user is provided with an option to discard a virtual anchor. Discarding a virtual anchor, when the user has been notified of the availability of the virtual anchor's media content, causes the virtual anchor and its current media content, to be inactive and unavailable to the user. Once new media content has been added to the virtual anchor, however, the user can again access the new media if and when the user revisits the virtual anchor's specific location.

While a user may not access a virtual anchor's content unless and until that user is at the specific location for a specific virtual anchor, one implementation of the invention allows for the user's mobile computing device to access and store the virtual anchor data structures for virtual anchors with locations within a predetermined area around the user's current location. This allows for quicker checking to determine if the user is within range of a virtual anchor as the geographic coordinates for the virtual anchors which are near have already been stored in the user's mobile computing device. Of course, the coverage of the area around the user's current location can be configurable. As an example, virtual anchors with specific locations within a 100 foot radius of the user's current location can have their virtual anchor data structures retrieved and stored on the user's mobile computing device. Alternatively, instead of a 100 foot radius around the user's location, the area can be expanded so that any virtual anchors with locations within a 200 foot radius of the user's current location can have their data structures retrieved. As can be imagined, this list of virtual anchors whose data structures are retrieved will constantly change if the user is moving. For such an eventuality, the device may employ various algorithms to determine the user's direction of travel and to thereby retrieve more data for virtual anchors in the direction of the user's travel. This can be done such that, as an example, virtual anchors for 100 feet from the user's current location in the direction of the user's travel are retrieved while virtual anchors for only 50 feet from the user's current location in the opposite direction of the user's travel are retrieved.

It should be noted that, in another embodiment of the invention, once a user has accessed a specific virtual anchor, this allows the user to access other anchors and media content once the user is within the detection range or activation range of the specific anchors. In one variant, accessing a virtual anchor allows the user to access other virtual anchors related to the accessed virtual anchor. As an example, if a user accesses a virtual anchor relating to a tourist spot in a city, this allows the user to access or be guided to other tourist-related virtual anchors in the same city, even if those other virtual anchors are not in the immediate vicinity of the user. This allows anchors to be linked to one another. Anchors can therefore be related to one another based on their content, the categories that the anchors belong to, the author of the anchor, or any other suitable criteria. By accessing one virtual anchor, the user can be guided to another virtual anchor linked to the previous anchor, even if the new anchor is not within the detection range of the system. Thus, the user can be led or guided to a series of linked anchors by merely accessing any one of the series of anchors even if the user is nowhere near any of the other anchors.

It should be clear that the access to other linked virtual anchors can be automatic or they can be based on user input. Thus, a user accessing a virtual anchor A linked to virtual anchor B can either be automatically given access to virtual anchor B or he can be prompted as to whether he wants access to virtual anchor B.

Virtual anchors can also be used to automatically launch applications or content based on the settings of the specific anchor. Once a user is at the location associated with a specific anchor such that the user can access the virtual anchor, the user's device can automatically launch applications or content access programs so that the specific content associated with that virtual anchor is automatically accessed by the user's device. As an example, if a user is authorized to access a virtual anchor at a hill favoured by joggers, the virtual anchor can be used to automatically play a playlist of audio content (e.g. the author's favourite music used to run up the hill) put together by the virtual anchor's author. Or, similarly, if a user is at a historical location associated with a virtual anchor, the virtual anchor can automatically launch a slide show detailing the historical importance of the location as well as launch an audio file guiding the user through the location.

As noted above, a user can be notified if an event relating to a specific virtual anchor occurs. As noted above, this event can be the addition of content associated with the virtual anchor, the creation of another virtual anchor by the same author, the creation of another virtual anchor by an author followed by the user, the creation of another virtual anchor in the same category as the original anchor, the creation or editing of a virtual anchor by a member of a group to which the user belongs, or any other suitable event. The notification would inform the user of the event, the addition of any new virtual anchors affected by the event to the user's device, the identification of properties of any new virtual anchors added (e.g. the new anchor's group, author, categories, etc.), as well as the location of any new virtual anchors. In one variant, instead of automatically adding any new virtual anchors, the user is prompted to determine whether the user wishes to add the new virtual anchor and whether the user wishes to access the new virtual anchor by virtue of being linked to a previously existing anchor. Of course, the content can only be accessed by the user once he or she is within the detection or activation range of the new virtual anchor.

A user can also create a "Favorite Anchors List" which would, in essence, bookmark specific anchors. The user can be guided to these specific anchors even if these anchors are not within the detection range of the user's location.

In one variant, virtual anchors can have a "sensitivity" setting that determines when the anchor can be detected by authorized users. A user can thus detect anchors within a given distance from the location associated with that anchor while, at the same time, that user cannot yet access the content associated with the anchor. Once the user is within an active range (i.e. within a specific given distance from the location), the user can access the content associated with that anchor. Of course, the detection distance from an anchor's location (i.e. the distance from the location by which the anchor can be detected by an authorized user) is generally larger or greater than an active range (i.e. the distance from the location where the user can actually access the content associated with the anchor).

Regarding the databases, the media content database and the virtual anchor database will, as noted above, be accessible by way of the servers 50. The user database is also accessed by way of these servers. The user database stores user information and user identification, as well as user profiles. User profiles will include user privileges which affect the user's ability to create virtual anchors, public (e.g. freely accessible virtual anchors) virtual anchors, and the ability to extend virtual anchor longevity. User restrictions, user groups, and user preferences are all also stored in the user database.

The media content database is, as noted above, used to store media content associated with virtual anchors. The database can store any and all types of media content which can be associated with virtual anchors including all types and formats of audio, video, text, images, as well as links to websites, email addresses, advertisements, and other manners of content. Such content is retrieved from the media content database and sent to the relevant user mobile computing device for presentation to the user.

The above noted servers are the entry point for users to use the system. The servers operate to receive requests to create, delete, and add media content to a virtual anchor as well as any requests to change the status of a virtual anchor. The servers will also process user mobile computing device requests for virtual anchors in the area around the mobile computing device location. However, calculations regarding the range/sensitivity or proximity of virtual anchors as well as the area around a mobile device location are performed on the mobile computing device. The servers also receive and process requests for media content for specific virtual anchors from user mobile computing devices. The servers receive these requests and retrieve the media content from the media content database and forward this media content to the relevant user mobile device. User accounts, settings, restrictions, user profiles, as well as account creation and deletions are also dealt with by the servers.

The system overseeing the various databases and servers can also be configured to have multiple user types and service levels. Users may be basic users, intermediate users, advanced users, organizational users, and super-users. Basic users can only create private virtual anchors which are shareable with other users or groups that the basic user belongs to. These users may also delete, change the status of, and add media content to their own virtual anchors. Public virtual anchors are freely accessible and can therefore be accessible to basic users. Basic users may also add media content to virtual anchors which have been shared with them, including public virtual anchors.

Intermediate and advanced users are able to create groups and add members to these groups. In addition to these capabilities, advanced users can also create public virtual anchors. Organizational users can create virtual anchors in batches and do not need to be physically at a specific location to create a virtual anchor for that location. These users can also extend the lifetime of their virtual anchors. Super-users can modify, delete, or otherwise adjust any media content or virtual anchor.

It should be noted that those users who create virtual anchors also have control over the type and content of media content associated or added to the virtual anchors they create. Virtual anchor creators can, when they create the virtual anchor, specify the types of media content which can be uploaded for association with the virtual anchor. Virtual anchor creators can also have control over the media content once the virtual anchor has been created. As an example, the creator (or a virtual anchor owner) can exercise editorial control over content uploaded. Before the media content uploaded can be associated with a specific virtual anchor, the anchor creator or anchor owner can reject or accept that media content. If accepted, the media content is associated with the relevant virtual anchor and is stored in the content database. If rejected, the uploaded media content may be deleted or sent back to the user who uploaded the content.

For public virtual anchors and, depending on the configuration of the virtual anchors, some private virtual anchors as well, a user-based ranking or feedback system may be used. This would allow users who have access to the virtual anchors to rate the virtual anchor and the media content associated with it. As well, this would allow users to register complaints with the virtual anchor owner or the system administrators. The complaints may, of course, include complaints regarding offensive content or inappropriate content.

It should be noted that the term "mobile computing device" includes any and all computing devices capable of connecting to a network including the Internet whether the connection is wired or wireless. This includes smartphones, tablet computers, notebook computers, certain types of cellular telephone handsets, as well as wearable computing devices. Preferably, the mobile computing device is also able to interact and receive signals and data from GPS and GLONASS type satellite networks. These mobile computing devices are, again, preferably able to connect/interact with any of the following network/telecommunication technologies: Wi-Fi, GPRS, EDGE, 3G, 4G, HSPA. Of course, other wireless/networking/telecommunications technologies may be used with the invention. As long as the mobile computing device has network access and can access the Internet at some point, the mobile computing device can be used with the invention.

Figure 2:
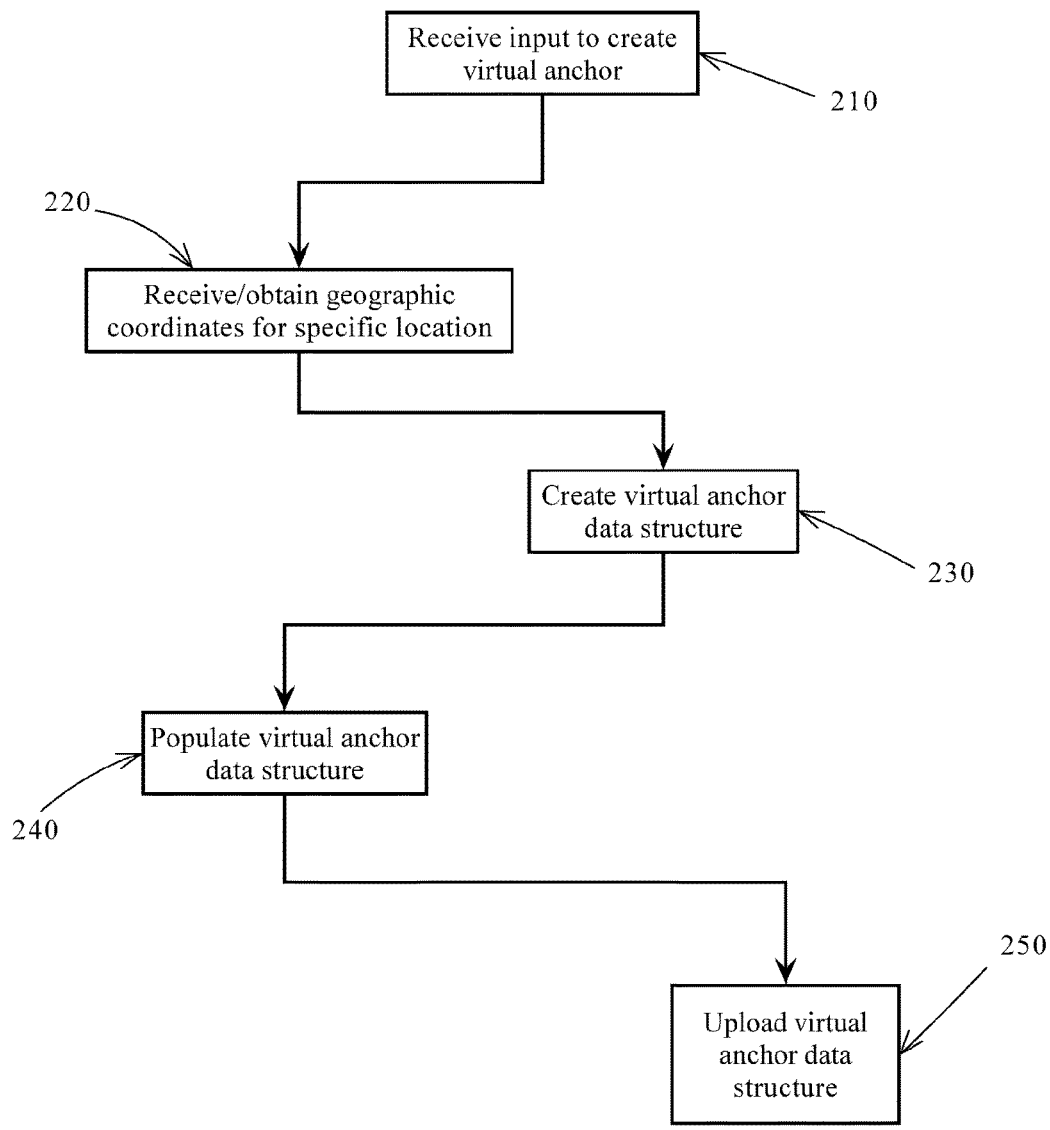
FIG. 2 is a flowchart illustrating the steps in a method for creating a virtual anchor according to another aspect of the invention.

Referring to FIG. 2, the steps in a method for creating a virtual anchor are detailed in the flowchart of FIG. 2. The method starts at step 210, that of receiving a user input requesting that a virtual anchor is to be created. The type of user input for this step may depend upon the user interface on a user's mobile computing device being used by the user. Step 220 is that of receiving or obtaining the geographic coordinates of the mobile computing device being used to create the virtual anchor at the specific location to be associated with the virtual anchor. As noted above, this may take form of receiving/determining the mobile computing device's geographic coordinates by way of satellite-based geolocation using GPS, GLONASS, or other similar satellites and technologies. Alternatively, this may take the form of determining the mobile computing device's geographic coordinates using Internet-based or cellular tower-based technologies. As another alternative, Internet-based geolocation technologies such as Google Maps™ or Mapquest™ may be used. The geographic coordinates may take the form of longitude, latitude, and/or altitude readings or the coordinates may take the form of a street address.

Once the geographic coordinates of the specific location to be used for the virtual anchor has been obtained, step 230 is that of creating the virtual anchor data structure. The virtual anchor data structure may already be available on the user's mobile computing device as a blank data structure with the appropriate fields provisioned for or it may be available as a blank general form with the relevant fields already set up. Regardless of the form of the virtual anchor data structure, this is provided to the user to fill out/complete the relevant fields. The user performs this step (step 240) by completing/populating the fields in the data structure. As noted above, some fields maybe pre-populated or previously filled out while others will need user input. The user input fields may include the public/private status of the virtual anchor, a listing of the users allowed to view/interact with the virtual anchor, as well as the media content to be associated with the virtual anchor. As might be imagined, completing the virtual anchor data structure may take different forms and may involve different steps which depend on the type/configuration of the user interface for the implementation of the mobile computing device aspect of the invention. After the virtual anchor data structure has been completed, it can then be uploaded, with the media content to be associated with it, to the various relevant servers (step 250).

Figure 3:
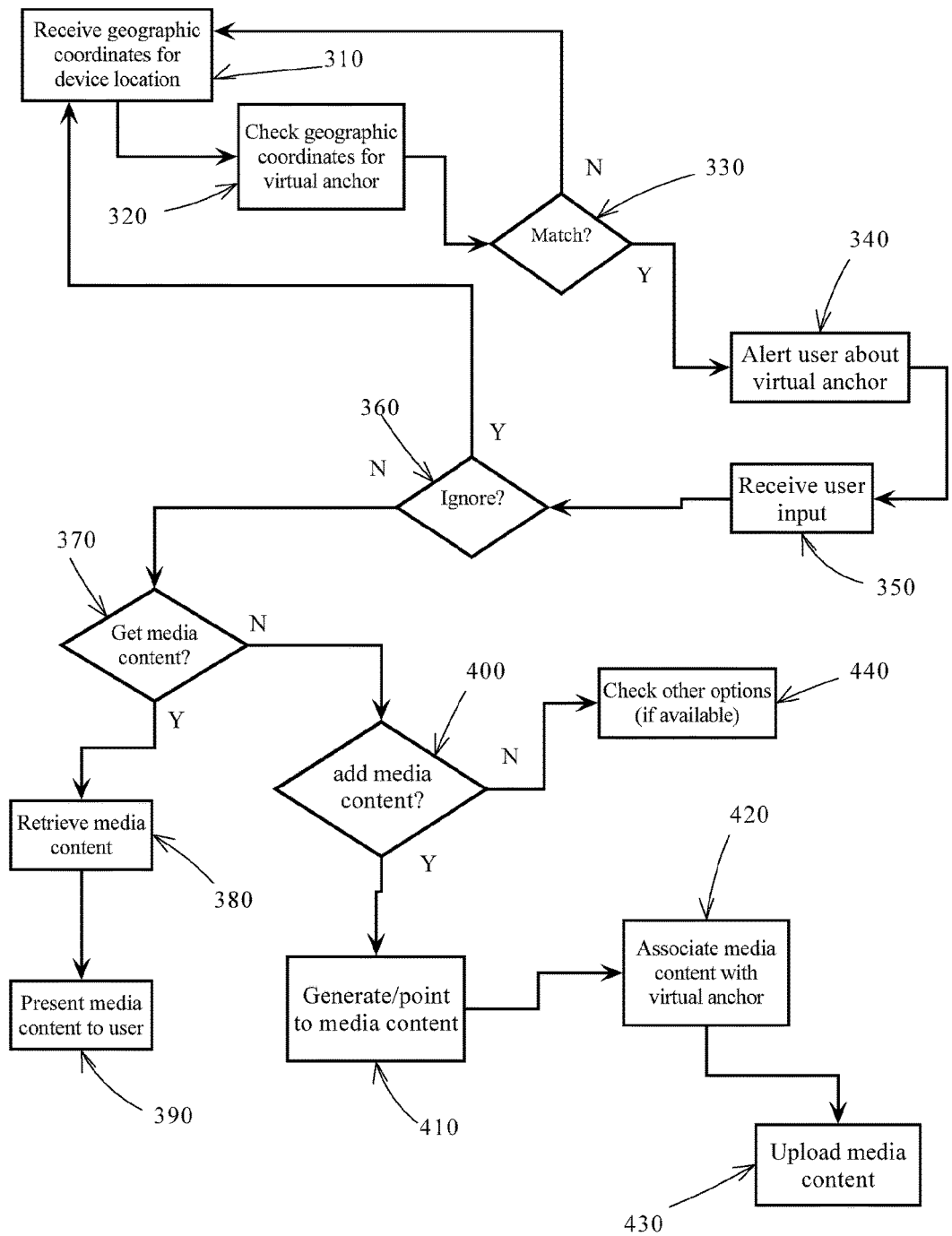
FIG. 3 is a flowchart detailing the steps in a method for accessing media content associated with a virtual anchor according to another aspect of the invention.

Referring to FIG. 3, a flowchart for the steps in a process for interacting with a virtual anchor is illustrated. The process begins with step 310, that of receiving/determining the geographic coordinates of the mobile computing device used by the user. These geographic coordinates are then checked against the geographic coordinates associated with at least one virtual anchor (step 320). Steps 310 and 320 may be combined into a single step of checking whether the user mobile device is within a proximity of a virtual anchor. The details for this virtual anchor (or anchors) may be previously stored on the mobile computing device or it may be retrieved as necessary from the virtual anchor database. Step 330 then decides if there is a match between the geographic coordinates of the mobile computing device and the geographic coordinates of the virtual anchor. It should be noted that the term "match", in this context, means determining if the mobile computing device is within range of the virtual anchor specific location. As noted above, being within range means that the mobile computing device is within a predetermined distance from the specific location for the virtual location. This may be implemented by merely determining a given radius from the center of the specific location's geographic coordinates and, if the mobile computing device is within this radius, then the mobile computing device's geographic coordinates match those of the virtual anchor. Of course, the above assumes that the user is authorized to access or interact with the relevant virtual anchor. If the user is not authorized to access this virtual anchor, then the mobile computing device's geographic coordinates are not checked for a match with the geographic coordinates of the virtual anchor.

Returning to the flowchart in FIG. 3, if there is no match between the two geographic coordinates, then the logic flow returns to step 310, that of determining the mobile computing device's geographic coordinates. If there is a match, then step 340 is that of alerting the user to the presence of the virtual anchor and the availability of media content associated with that virtual anchor. Step 350 then receives user input regarding this virtual anchor.

Step 360 checks to see if the user input indicates a desire to ignore the virtual anchor. If this is indicated by the user input, then the logic flow returns to step 310, that of finding the mobile computing device's geographic coordinates. If the user does not indicate a desire to ignore the virtual anchor, then step 370 determines if the user wishes to access the media content associated with the virtual anchor. If the user wants to access the media content, then step 380 is that of retrieving the relevant media content. Step 390 then presents that media content to the user.

If, on the other hand, the user does not want to access the media content, then step 400 checks if the user wants to add media content to the virtual anchor. If the user input indicates a desire to add media content (and, again, assuming that the user is authorized to add this media content), then step 410 is that of generating or pointing to the media content on the user's mobile computing device. The generation of the media content may involve the user using the mobile computing device to generate the media content by, for example, taking a photo, recording an audio message, generating video content, or typing out a text based message. Pointing to the media content may involve the user selecting a pre-existing file on his mobile computing device and tagging that as the media content to be added.

Once the relevant media content has been generated and/or tagged, this media content is then associated with the virtual anchor (step 420). This may require the user to adjust or edit the virtual anchor's data structure or simply associate the name of the virtual anchor with the specific media content. The final step is that of uploading the media content to the relevant media content database as well as uploading any edited virtual anchor data structure or any virtual anchor data to the virtual anchor database (step 430).

It should be noted that if the user does not wish to add media content, then other options may then be presented to the user (step 440). These other options may vary depending on the implementation of the system.

Figure 4:
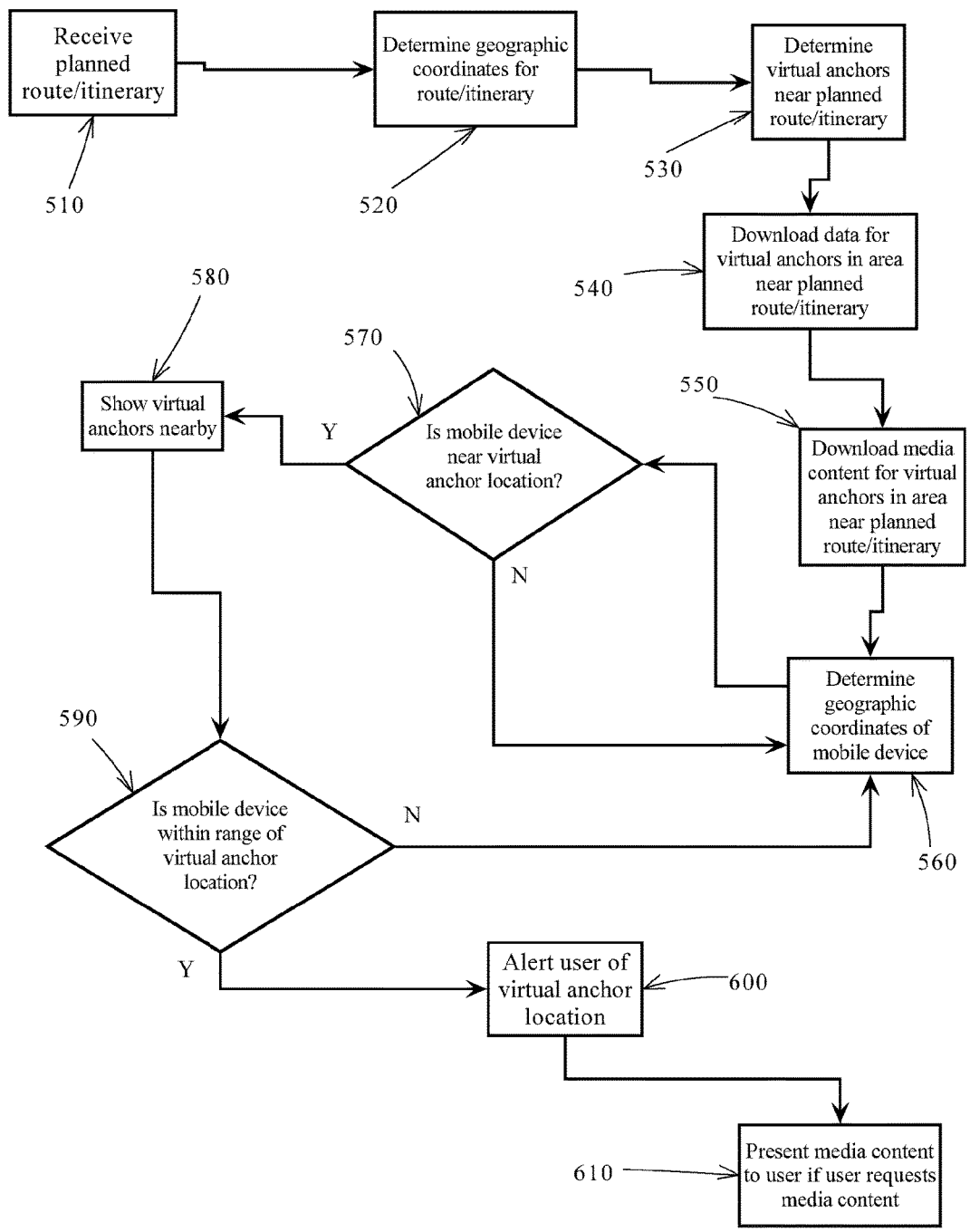
FIG. 4 is a flowchart illustrating the steps in a method for accessing media content associated with virtual anchors when a user's mobile computing device is operating in an offline mode.

Referring to FIG. 4, a flowchart detailing the steps in a process for accessing virtual anchor content when the mobile computing device is in offline mode is presented. The process begins at step 510, that of receiving a planned route or itinerary on the mobile computing device. The geographic coordinates for the route or itinerary is then computed (step 520). This can be done by highlighting a number of points on the route or itinerary and then connecting these points. The geographic coordinates for the points on the route as well as the coordinates for the connecting paths are determined. Step 530 is that of determining the virtual anchors which are near the planned route or itinerary. This can be done by querying the virtual anchor database for virtual anchors which have a specific location which is in the area of the planned route. The geographic coordinates for the specific locations for these virtual anchors are then found and, if the geographic coordinates for the specific locations are within a given distance (e.g. 200-500 feet) from the route or from any of the points on the itinerary, then these virtual anchors are determined to be near the route.

Once it has been determined which virtual anchors are near the route, the data for these virtual anchors are downloaded to the mobile computing device (step 540). This data includes the virtual anchor status, which media content is associated with the virtual anchors, as well as the categories for these virtual anchors. Step 550 is that of downloading at least one media content for each one of the virtual anchors for which data was downloaded in step 540. This media content is then stored on the mobile computing device's storage module.

With the data and the media content for the virtual anchors near the route, the next step is that of determining the geographic coordinates of the mobile computing device (step 560). A determination is then made to see if the mobile device is near one of the virtual anchors which have been previously determined to be within the area (step 570). This can be done by comparing the mobile device's geographic coordinates with the geographic coordinates of the virtual anchors for which the data was downloaded in step 540. If the mobile computing device's geographic coordinates are within a given distance from the virtual anchor's geographic coordinates (e.g. 200-500 feet), then the virtual anchor is determined to be near the mobile computing device's location. If the mobile device is not determined to be near the virtual anchor, then the logic flow returns to step 560. On the other hand, if the mobile device is near at least one of these virtual anchors determined in step 530, then these virtual anchors are shown to the user (step 580).

Once it has been determined that the mobile device is close or near to a virtual anchor, then a determination is made if the mobile device is within range of one of these virtual anchors (step 590). As noted above, being within range of a virtual anchor means that the virtual anchor specific location is within a predetermined distance (e.g. 10-20 feet) of the mobile computing device's geographic coordinates. If the mobile computing device is not within range, then the logic flow returns to step 560. If the mobile computing device is within range, then the user is alerted to the presence of this virtual anchor (step 600). The media content for this virtual anchor can then be presented to the user if the user requests it (step 610). It should be noted that, as the media content for this virtual anchor was previously downloaded to the mobile computing device in step 550, then there is no need to access the media content database.

In one implementation of the invention, the logic flow follows as in FIG. 4 but with steps 570 and 580 bypassed. The logic flow follows from step 560 directly to step 590. Once the geographic coordinates of the mobile device have been determined in step 560, step 590 then determines if the mobile device is within range or in the proximity of a virtual anchor location.

It should be noted that, in the event the user's mobile computing device is offline when executing the above noted methods and processes, the media content and/or the virtual anchor data structures and/or virtual anchor data which would need to be uploaded to the servers are stored on the mobile computing device's storage module. Once the mobile computing device is again operating in online mode (i.e. it has a suitable Internet connection), the media content and virtual anchor data or data structures stored on the mobile computing device's storage module can be uploaded as necessary.

The systems and methods of the present invention may be useful for various businesses for not just marketing purposes but also for providing extra content to their customers. Television networks, print and online media such as journals and magazines would find the present invention useful as print and online content can now be given an extra dimension of interaction as content consumers will now need to physically visit locations mentioned in the content to access extra media content relating to the location. Other businesses may also take advantage of the present invention to advertise their goods and services. For example, a user walking in front of a specialty food store can receive a notification of an article making specific recommendation concerning the store. Similarly, a user passing by a restaurant can be notified of the latest critique of the restaurant published in a journal or magazine. Another example can be of a user being notified of a special documentary article in a journal or magazine about a heritage or a touristic attraction as the user walks near the attraction.

Alternatively, the user could be notified of a video documentary regarding the attraction as the user approaches that attraction. In another example, store owners may create virtual anchors that will notify nearby users of special offers and discounts currently available.

In a different context, users will also find the present invention useful as a means to share their findings and hobbies. In one example, a passionate mushroom hunter or bird watchers may create a virtual anchor for his or her best viewing/picking spot with other users in his/her group. Similarly, a user can also create a virtual anchor at a newly discovered restaurant or store to share that discovery with friends. This can be made into a pleasant surprise for the friends as the user can leave a note at the location for the friends to find. Users can also create a virtual anchor at a specific site where the media content are old photos of the site and sharing these photos with users who visit that location. A virtual anchor can also be created at a location where a historical event took place. Users can thus be notified of the historical event when they walk by the location. Not only that, but users can have the virtual anchor play audio content that describes the historical importance of the location.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for accessing media content relating to specific virtual anchors for specific geographic locations by way of a mobile computing device, the method comprising:
   a) receiving input relating to a planned route for a mobile device used by a user;
   b) determining geographic coordinates for said planned route;
   c) sending a query to a server for virtual anchors associated with geographic locations within a predetermined distance of said planned route, said query containing said geographic coordinates for said planned route;
   d) receiving details for said virtual anchors associated with geographic locations within said predetermined distance of said planned route, said details including geographic coordinates of said geographic locations;
   e) downloading at least one media content for each of said virtual anchors in step d) to said mobile device;
   f) determining geographic coordinates of a mobile device location for said mobile computing device;
   g) determining if geographic coordinates of said mobile device location is within a range of geographic coordinates of a specific geographic location associated with a specific virtual anchor found in step d);
   h) in the event said mobile device is within range of said specific geographic location, alerting a user of said mobile computing device of a presence of one of said at least one nearby virtual anchor; and
   i) repeating steps f)-h) while said mobile device travels on said planned route.

2. A method according to claim 1 wherein said geographic coordinates comprise longitude and latitude.

3. A method according to claim 1 wherein said geographic coordinates are determined by using at least one location acquisition technology.

4. A method according to claim 1 wherein said mobile device is operating in offline mode while travelling on said planned route.

5. A method according to claim 1 wherein step h) further comprises presenting media content associated with said virtual anchor upon receipt of a positive user input to present said media content.

* * * * *